United States Patent [19]

Kuzdzal et al.

[11] Patent Number: 5,613,781
[45] Date of Patent: Mar. 25, 1997

[54] HANGING SPRING SUPPORTED SQUEEZE FILM DAMPING SYSTEM FOR SHAFT BEARING

[75] Inventors: Mark J. Kuzdzal; Harry F. Miller, both of Allegany, N.Y.

[73] Assignee: Dresser-Rand Company, Corning, N.Y.

[21] Appl. No.: 640,040

[22] Filed: Apr. 30, 1996

[51] Int. Cl.[6] .................................................. F16C 39/40
[52] U.S. Cl. ............................ 384/99; 384/215; 384/312
[58] Field of Search .......................... 384/99, 119, 215, 384/309, 312, 442, 443, 218

[56] References Cited

U.S. PATENT DOCUMENTS

| Re. 30,210 | 2/1980 | Buonon et al. | 384/581 |
|---|---|---|---|
| 360,237 | 3/1887 | McGrath | 384/218 |
| 390,880 | 10/1888 | McGrath | 384/218 |
| 1,210,085 | 12/1916 | LeBlanc | 384/218 |
| 2,137,487 | 11/1938 | Hall | 384/307 |
| 3,439,924 | 4/1969 | Ludewig et al. | 277/137 |
| 3,456,992 | 7/1969 | Kulina | 384/100 |
| 3,485,540 | 12/1969 | Nogle | 384/119 |
| 3,912,342 | 10/1975 | Schirm et al. | 384/131 |
| 4,012,085 | 3/1977 | Kunderman | 384/220 |
| 4,027,931 | 6/1977 | Streifert | 384/117 |
| 4,084,861 | 4/1978 | Greenberg et al. | 384/99 |
| 4,457,634 | 7/1984 | Vinciguerra | 384/215 X |
| 4,605,316 | 8/1986 | Utecht | 384/99 |
| 4,660,838 | 4/1987 | Katayama et al. | 277/97 |
| 4,668,105 | 5/1987 | Furukawa et al. | 384/99 |
| 4,981,415 | 1/1991 | Marmol et al. | 415/174.2 |
| 5,044,781 | 9/1991 | Werner | 384/99 |
| 5,056,935 | 10/1991 | Singh | 384/99 |
| 5,085,521 | 2/1992 | Singh | 384/99 |
| 5,088,840 | 2/1992 | Radtke | 384/535 |
| 5,421,655 | 6/1995 | Ide et al. | 384/99 |

Primary Examiner—Thomas R. Hannon
Attorney, Agent, or Firm—Sidley & Austin

[57] ABSTRACT

A damper film bearing assembly for supporting a rotatable shaft of a turbomachine includes a housing having a central bore sized to receive the bearing member, and an annular cavity formed within the housing around the central bore. The annular cavity includes an outer wall that is concentric with the central bore. A bearing member having an annular outer surface and an inner bearing surface is mounted within the cavity and engages the shaft to support the shaft within the housing. A fluid film damper mechanism acts between the annular outer surface and the outer wall of the cavity for damping radial movement of the bearing member within the cavity. A resiliently adjustable dead weight hanging spring support system acts between the housing and the bearing member to support the dead weight of the shaft within a vertically centered position within the central bore so that the fluid film damper means functions to maintain the shaft centered within the bore when vibrations occur during rotation of the shaft.

20 Claims, 2 Drawing Sheets

5,613,781

HANGING SPRING SUPPORTED SQUEEZE FILM DAMPING SYSTEM FOR SHAFT BEARING

FIELD OF THE INVENTION

This invention relates generally to a support structure for rotatably supporting a shaft. More particularly, the invention relates to a squeeze film damper bearing support system utilizing at least one hanging spring assembly to support the dead weight of the shaft in a turbomachine.

BACKGROUND OF THE INVENTION

The use of fluid film damping for high speed rotating shafts in turbomachinery is well known in the art. In general, such a damping system includes a radially movable non-rotating bearing support member positioned generally coaxially with the shaft, a bearing positioned between the movable bearing support member and the rotatable shaft, and a pair of axially spaced O-rings defining an annular fluid film chamber between the movable bearing support member and a fixed housing. The movable bearing support member can be an outer annular race of a roller bearing element or a cage of tilt pad bearings. The annular fluid film chamber is used to confine a pressurized oil film. The clearance between the movable bearing support member and the fixed housing is very small, so that the oil film can be squeezed between the two confronting surfaces. During rotation at high speeds, the shaft may vibrate, moving transversely radially and orbitally, causing the movable bearing support member to also move in the same direction. Such motion acts to exert a compressive force on a portion of the oil film so as to squeeze an annular segment of the oil film, thereby causing viscous flow of the oil and resistance to the motion of the movable bearing support member.

To achieve acceptable damping from a squeeze film damping assembly, the non-rotatable bearing support member must be able to move within the housing. This is hard to achieve when, even though the O-rings are still adequate to horizontally center the movable bearing support member, the O-rings cannot support the weight of the shaft and bearing, thus permitting the movable bearing support member to rest on the bottom of the housing bore.

In Streifert, U.S. Pat. No. 4,027,931, a non-rotating, movable annular bearing support member, which is provided with a fluid film damper, is positioned between a rotating shaft and a stationary bearing housing with the movable bearing support member carrying the bearings which act to support the shaft within the housing. The movable bearing support member is supported by a squirrel cage spring for centering the shaft, the squirrel cage spring being mounted coaxially with the shaft and extending axially relative to the movable bearing support member so that one end of the squirrel cage spring is secured to the stationary bearing housing and the other end of the squirrel cage spring is attached to the movable bearing support member, forming a cantilever support. The fluid film dampening is achieved by positioning two O-ring seals at axially spaced apart locations in the annular space between the inside wall of the stationary bearing housing and the outer wall of the movable bearing support member to provide a squeeze film cavity, and introducing oil under pressure into the squeeze film cavity to form the oil film damper. Such pressure can be the normal oil supply pressure, which is generally in the range of about 15 to about 20 psig.

To improve the effectiveness of the oil film damping system, various mechanisms have been employed including springs for centering the shaft. One such prior art mechanism, which addresses the problem of compensating for the dead weight of the rotor shaft, is disclosed in Streifert, U.S. Pat. No. 4,027,931, wherein at least one helper spring is mounted within the portion of the annular squeeze film cavity below the horizontal centerline of the shaft so as to support the dead weight of the shaft and thus eliminate the harmful effects of the heavy shaft upon the squirrel cage spring and the squeeze film cavity. Each helper spring is a longitudinally extending beam having radially outwardly extending support pads at the axial ends of the radially outer surface of the beam and a radially inwardly extending pad at the center of the radially inner surface of the beam.

Similarly, Marmol et al, U.S. Pat. No. 4,981,415 discloses the use of one or two segmented arcuate springs mounted between a fixed support member and a non-rotatable movable bearing support member, with the damper film being formed between the movable bearing support member and the fixed support member, and with a roller bearing positioned between the movable bearing support member and the shaft. Each segmented arcuate spring consists of five segments positioned to form an annular ring generally coaxial with the shaft, with each segment having a radially outwardly directed land at each end of its radially outer surface and an inwardly directed land at the center of its radially inner surface, whereby when the inwardly directed land contacts the shaft the center portion of the segment is caused to flex radially outwardly. The segmented arcuate springs function to absorb the energy attendant the vibration of the shaft during operation. In the static condition, the springs also serve to center the shaft.

Important to the proper functioning of any of the foregoing described fluid film damper systems is proper attention to the stiffness and damping of the system. Effective damping of vibrational movement of the shaft in a turbomachine is enhanced if uniformity of the damper film is preserved between the movable bearing support member and the fixed housing. The uniformity of the damper film is difficult to achieve in a squeeze film bearing support system for a horizontally extending shaft, since the weight of the shaft places a high unidirectional loading upon the movable bearing support member. As a result of this loading, the movable bearing support member is hindered in its ability to move vertically within the housing, and consequently is unable to respond freely to vertical shaft vibrations. By supporting the movable bearing support member in a manner that reduces the stiffness associated with its radial movement, the movable bearing support member is permitted to respond freely to vertical shaft vibrations as well as to horizontal shaft vibrations, and the uniformity of the damper film can be more effectively maintained.

SUMMARY OF THE INVENTION

An objective of one aspect of the present invention is to provide a new and improved damper film bearing assembly which is particularly adapted for use in supporting a heavy dead weight rotor load. An object of another aspect of the invention is to provide a damper film bearing assembly that is adjustable over a range of different heavy dead weight loads so as to obtain optimum levels of stiffness and damping for the particular dead weight load involved. More specifically, the present invention aims to achieve the foregoing through the use of a hanging spring support assembly, in conjunction with the fluid damping mechanism, to minimize or eliminate the effect of the dead weight load of the rotor assembly on the damper bearing mechanism.

In accordance with the present invention, a damper film bearing assembly for supporting a rotatable shaft of a turbomachine comprises a fixed housing having a bore therethrough sized to receive the shaft with a longitudinal axis of the shaft extending at least generally horizontally through the bore. The fixed housing has an annular cavity which is open to the bore around the circumference of the bore. The annular cavity has an annular wall surface which extends generally parallel to the longitudinal axis of the housing bore. A bearing member is mounted within the cavity and includes an annular radially outer surface, confronting the annular wall surface of the cavity, and a radially inner surface, confronting the shaft so as to provide bearing support for the shaft within the fixed housing. A fluid film damper is formed between the annular radially outer surface of the bearing member and the annular wall surface of the cavity for damping movement of the bearing member within the cavity. At least one hanging support spring assembly is provided, with each hanging support spring assembly being mounted so as to be secured to and extend generally upwardly from an upper portion of the bearing member to the fixed housing for resiliently supporting the bearing member within a vertically centered position within the bore in opposition to a dead weight of the shaft, so that the at least one hanging spring assembly can function to center the bearing member within the bore of the housing and permit the fluid film damper to function to suppress both horizontal and vertical vibration of the shaft.

In a presently preferred embodiment, two support spring assemblies are positioned on opposite sides of and symmetrical to a vertical plane containing the longitudinal axis of the shaft. For each support spring assembly, the fixed housing has at least one outwardly facing shoulder associated with a hole in the fixed housing. Each support spring assembly comprises an elongated connector, with a first end of the connector being secured to an upper portion of the bearing member. The elongated connector extends upwardly through the hole so that the second end of the connector is positioned above the outwardly facing shoulder in the fixed housing. A support spring is positioned between the outwardly facing shoulder and the second end of the connector so as to resiliently urge the connector and the bearing member upwardly and thereby assist in maintaining the shaft in a vertically centered position within the bore. In one version, each elongated connector extends generally radially with respect to the longitudinal axis of the housing bore, while in another version each elongated connector extends at least substantially vertically. In either version, the angle between the vertical plane, containing the longitudinal axis of the shaft, and a line extending upwardly through the longitudinal axis of the shaft to the point of attachment of a support spring assembly to the bearing member is preferably less than about 25°, and more preferably is less than about 20°.

Each support spring can comprise at least one resilient member, e.g., a coil spring, a Belleville washer, etc., but is preferably a plurality of Belleville washers positioned in a stacked arrangement with respect to each other, with the stacked arrangement being positioned coaxially with the associated elongated connector.

Each support spring assembly is adjustable. In one embodiment, a spacer is positioned coaxially with and about the elongated connector between the outwardly facing shoulder and the support spring to provide the desired length along the longitudinal axis of the elongated connector for the support spring. The lengthwise portion of the elongated connector extending from the outer surface of the bearing member to the second end of the connector can be adjusted by varying the portion of the first end of the connector which is secured within the bearing member.

The bearing member can be an annular ring having a plurality of bearing shoes positioned circumferentially about the shaft and between the shaft and the inner surface of the annular ring, with each of the bearing shoes being loosely connected to the annular ring and having a radially inner surface confronting the shaft to provide bearing support for the shaft within the fixed housing.

The fluid film damper can comprise first and second O-rings positioned between the bearing member and the fixed housing, the O-rings being spaced apart from each other along the longitudinal axis of the housing bore to define a squeeze film chamber, and a passageway in the housing for supplying pressurized oil to the squeeze film chamber.

The foregoing and other objects and advantages of the present invention will become more apparent from the following description of the best mode for carrying out the invention when taken in conjunction with the accompanying drawings.

DETAILED DESCRIPTION OF THE INVENTION

Figure 1:
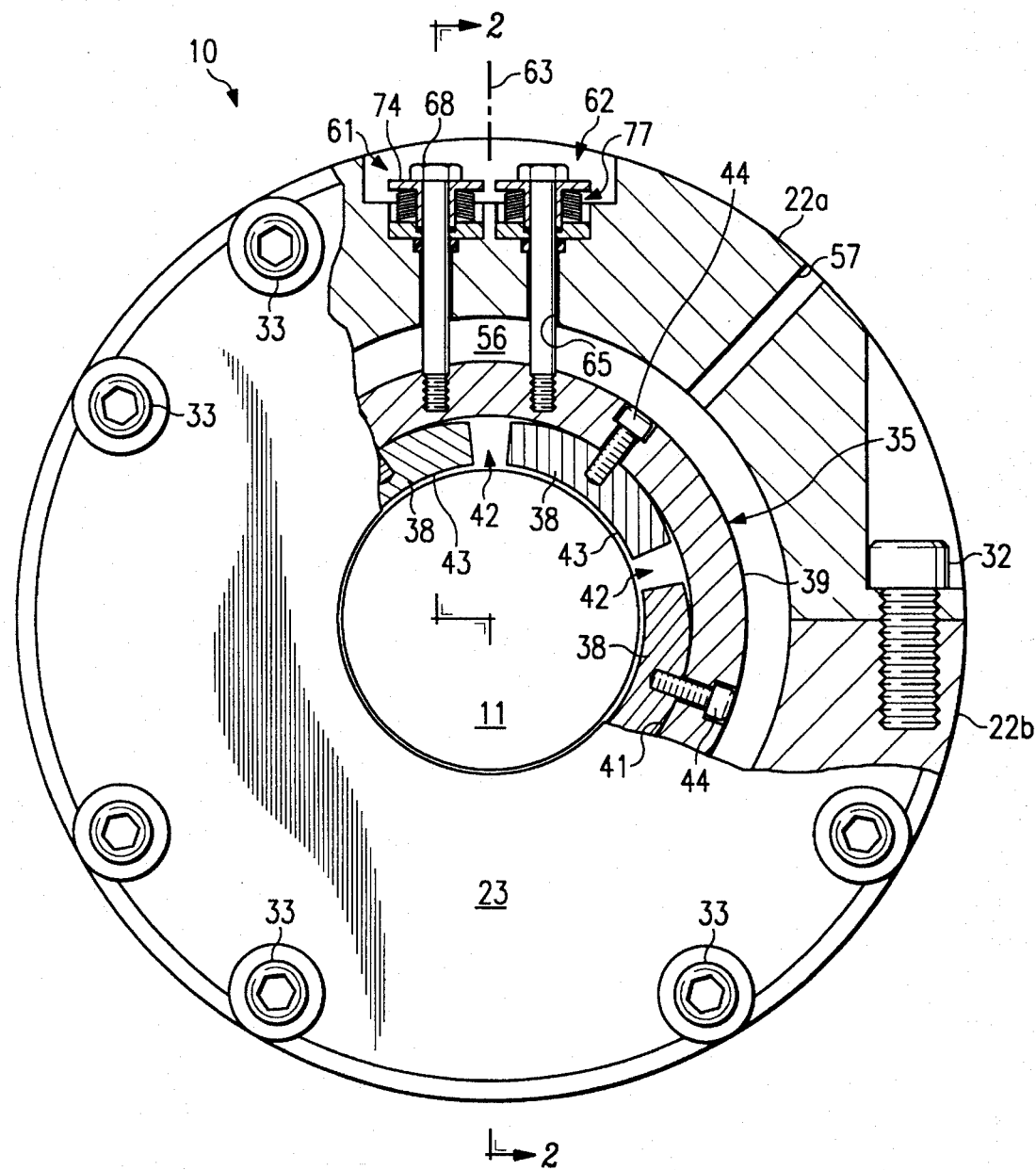
FIG. 1 is an end view of a squeeze film bearing support system in accordance with the present invention disposed circumferentially around the rotatable shaft, with portions thereof being in cross section.
Figure 2:
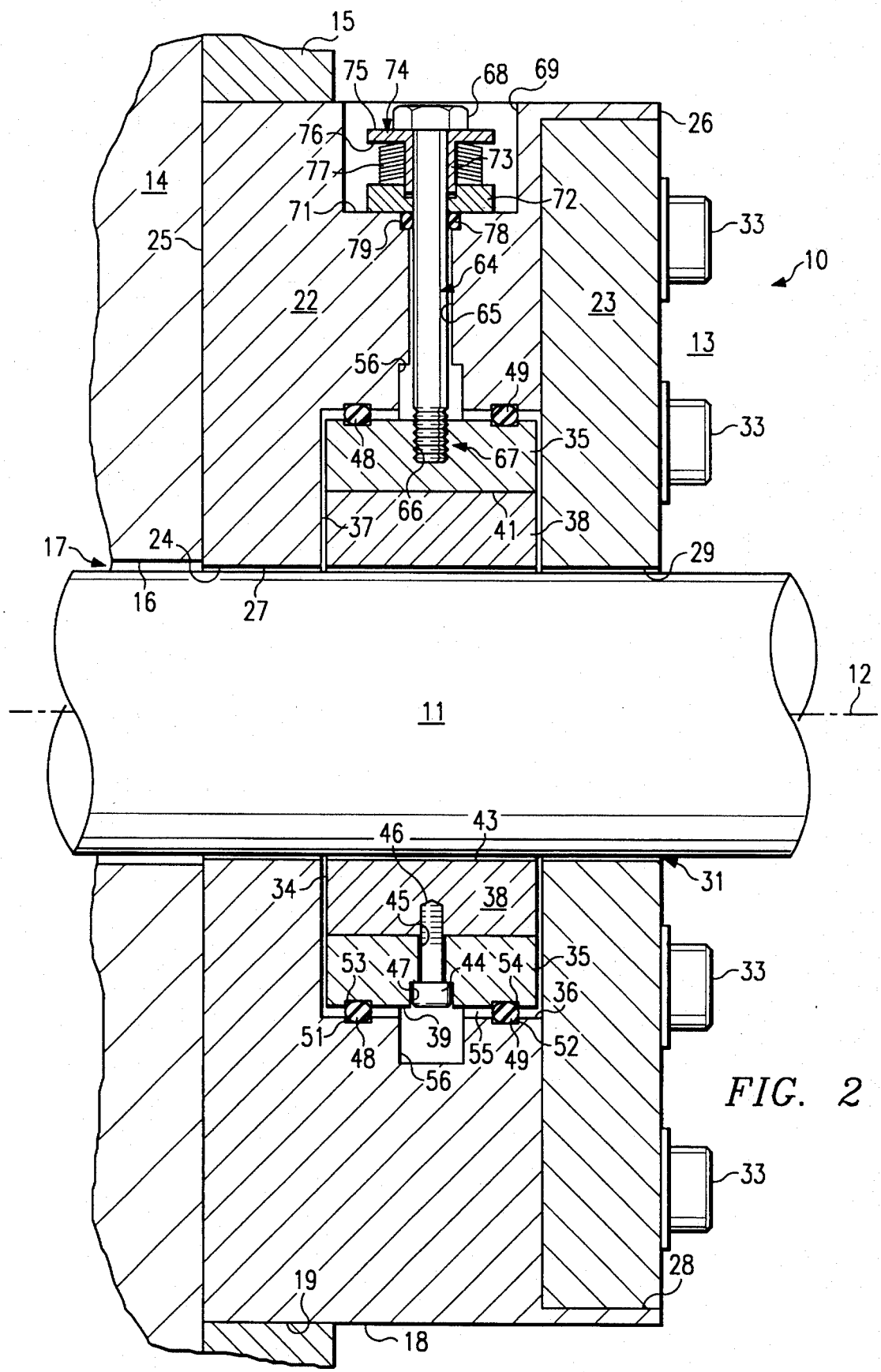
FIG. 2 is a cross-sectional view of the squeeze film bearing support system of FIG. 1, taken along the staggered section line 2—2 in FIG. 1, with the lower approximately two-thirds of the view being in a vertical plane containing the longitudinal axis of the rotatable shaft, and the upper approximately one third of the view being in a vertical plane through the left spring assembly in FIG. 1.

A presently preferred embodiment of the present invention is illustrated in FIGS. 1 and 2 as a damper squeeze film bearing assembly 10 for supporting a rotatable shaft 11 of a turbomachine.

The damper squeeze film bearing assembly 10 is shown disposed circumferentially about and concentric with the rotatable shaft 11, with the longitudinal central axis 12 constituting the longitudinal axis of the damper film bearing assembly 10 and the longitudinal central axis of the rotatable shaft 11. Unless otherwise stated, radial directions are directions which are radial to the central longitudinal axis 12, and longitudinal directions are parallel to the central longitudinal axis 12.

The damper squeeze film bearing assembly 10 is positioned in an annular chamber 13 formed by a first casing component 14 and an axially adjacent second casing component 15, each of the first and second casing components 14 and 15 having a bore therethrough for coaxially receiving the shaft 11. The diameter of the inner annular surface 16 of the bore through the first casing component 14 is slightly larger than the diameter of the adjacent portion of the rotatable shaft 11 to form an annular gap 17 therebetween. The diameter of the inner annular surface 18 of the bore through the second casing component 15 is only slightly larger than the diameter of the outer cylindrical surface 19 of the damper squeeze film bearing assembly 10 to form a tight fit of the damper squeeze film bearing assembly 10 within the casing component 15.

The damper squeeze film bearing assembly 10 comprises a circumferentially continuous annular housing 22 and an annular end cover 23. Each of the annular housing 22 and the end cover 23 has a bore therethrough for substantially coaxially receiving the shaft 11. The housing 22 has a radially inner generally cylindrical surface 24, formed by the bore through the housing 22, and a radially outer generally cylindrical surface which serves as the outer surface 19 of the damper squeeze film bearing assembly 10. The annular housing 22 also has a first axial end portion 25 and a second axial end portion 26 which are spaced apart along the central axis 12. The radius of the radially inner generally cylindrical surface 24 is only slightly greater than the radius of the adjacent portion of the rotatable shaft 11, so that the annular housing 22 serves as a bushing seal to provide a fluid film sealing clearance 27 between the shaft 11 and the annular housing 22. In general, the radial clearance 27 between the radially inner generally cylindrical surface 24 and the shaft 11 is substantially less than the radial clearance 17 between the shaft 11 and the first casing component 14. The end cover 23 fits within a recess 28 in the end portion 26 of the housing 22, with the radius of the radially inner generally cylindrical bore surface 29 of the end cover 23 being only slightly greater than the radius of the adjacent portion of the rotatable shaft 11, so that the end cover 23 also serves as a bushing seal to provide a fluid film sealing clearance 31 between the shaft 11 and the end cover 23. As shown in FIG. 1, the annular housing 22 is preferably formed as two halves 22a and 22b of a cylinder having a concentrically located bore, so that the two halves 22a and 22b can be positioned about the shaft 11 and then secured together by one or more bolts 32 on each side of the shaft 11. If desired, the end cover 23 can also be formed as two halves of a cylinder having a concentrically located bore, with the orientation of the dividing line between the two halves of the end cover 23 being generally perpendicular to the dividing line of the two halves of the annular housing 22. The annular housing 22 and the annular end cover 23 can be secured to each other and fixed to the first casing component 14 by a plurality of bolts 33 which extend generally parallel to the longitudinal axis 12, thereby preventing any movement of the annular housing 22 and the end cover 23. This arrangement permits the annular housing 22 to be inserted axially into the cavity 13 of the second casing component 15 in situations where the second casing component 15 is in one piece, i.e., not split.

The fixed annular housing 22 is provided with an annular chamber 34, which is open to the cylindrical bore surface 27 and to the axial end 26 and is sized to receive the annular bearing support member 35 which in turn supports the shaft 11. The annular chamber 34 has a longitudinally extending cylindrical wall surface 36, which is concentric with the cylindrical bore surfaces 27, 29 and is substantially coaxial with the shaft 11, and an axial end wall surface 37. The cover 23 forms the opposite axial end wall surface of the chamber 34.

In the illustrated embodiment of the invention, the annular bearing support member 35 is a bearing support cage for a plurality of tilt pad bearing shoes 38. The bearing support cage 35 is in the form of an annular ring having a radially outer cylindrical wall surface 39 and a radially inner cylindrical wall surface 41. The annular ring can be either circumferentially continuous or split into two 180° halves.

Each of the tilt pad bearing shoes 38 is positioned between the radially inner cylindrical wall surface 41 of the bearing support cage 35 and the exterior surface of the shaft 11, with the bearing shoes 38 being spaced apart from each other circumferentially about the shaft 11 so that there is a gap 42 between each adjacent pair of the bearing shoes 38. Each bearing shoe 38 has a radially outer wall surface that is sized and arranged to confront the radially inner cylindrical wall surface 41 of the bearing support cage 35 so that the bearing shoe 38 can pivot slightly about an axis which is parallel to the longitudinal axis of the bearing support cage 35. Each bearing shoe 38 has a radially inner wall surface 43 that is sized and arranged to slidingly mate with the exterior surface of the radially adjacent portion of the shaft 11 so as to provide support for the shaft 11.

Each of the bearing shoes 38 is supported by a respective threaded fastener, e.g., bolt 44, that extends loosely through a respective radially extending hole 45 in the bearing support cage 35, with the radially inner end of each bolt 44 being in threaded engagement with a respective internally threaded radially extending hole 46 in the bearing shoe 38, and the radially outer end of each bolt 44 being a head which is positioned within a counterbore 47 which is coaxial with the respective hole 45, with the head of the bolt 44 having a diameter which is larger than the diameter of the hole 45 and smaller than the diameter of the counterbore 47, so that each bearing shoe 38 is loosely secured to the bearing support cage 35 during assembly, and is permitted to freely move radially, within obvious mechanical limits, relative to the bearing support cage 35 so as to contact the exterior surface of the shaft 11 when the bearing support cage 35 and bearing shoes 38 have been assembled about the shaft 11. Each bearing shoe 38 can also rock or tilt about an axis which is generally parallel with the longitudinal axis 12 of the shaft 11 and which extends through the longitudinal axis of the associated bolt 44.

At least one of the cylindrical chamber wall surface 36 of the fixed housing 22 and the radially outer cylindrical surface 39 of the bearing support cage 35 is provided with a pair of annular grooves for receiving O-rings 48, 49. As the annular grooves are for the purpose of maintaining the longitudinal positions of the O-rings 48, 49, they can be provided in only the cylindrical surface 36 or in only the cylindrical surface 39 or in both of the cylindrical surfaces 36, 39. In the illustrated embodiment, the cylindrical chamber wall surface 36 has annular grooves 51, 52 formed therein, while the cylindrical surface 39 has annular grooves 53, 54 formed therein, with groove 51 facing and cooperating with groove 53 to collectively receive the O-ring 48 therein, and with groove 52 facing and cooperating with groove 54 to collectively receive the O-ring 49 therein. The grooves 51, 53 are spaced apart from grooves 52, 54 along the longitudinal axis of the shaft 11, and the diameter of each of the O-rings 48, 49 is greater than the total depths of the associated pair of grooves such that there is radial gap between the cylindrical wall surfaces 36, 39, so that an annular damper film chamber 55 is defined by the O-rings 48, 49, the annular portion of the cylindrical wall surface 36 between the grooves 51, 52, and the annular portion of the cylindrical wall surface 39 between the grooves 53, 54.

An annular passageway 56 is formed in the housing 22 so as to open in the cylindrical wall surface 36 throughout the circumference of the cylindrical wall surface 36 at a location between the O-rings 48, 49. An oil supply passageway 57 is provided in the housing 22 to provide fluid communication from an oil supply (not shown) to the damper film chamber 55 via the annular passageway 56, thereby supplying pressurized oil to the damper film chamber 55. The O-rings 48, 49 seal the damper film chamber 55 such that the oil does not leak past the axial ends of the bearing support cage 35, as well as support the bearing support cage 35. The fluid film damper acts between the annular outer cylindrical wall surface 39 and the cylindrical wall surface 36 of the annular cavity 34 so as to dampen any radial movement of the bearing support cage 35 within the annular cavity 34. Orifice passageways (not shown) can be drilled radially through the bearing support cage 35 to provide restricted flow between the annular damper film chamber 55 and the gaps 42 between adjacent pair of bearing shoes 38, in order to lubricate the pads 38 and facilitate the sliding of the shaft 11. It is presently preferred that the pressurized oil be continuously supplied through oil supply passageway 57 to the damper film chamber 55, thereby replacing oil which passes from the damper film chamber 55 to the gaps 42 via the flow restricted orifice passageways.

In accordance with the present invention, the improved damper film bearing assembly 10 is particularly adapted for use in adjustably supporting a heavy dead weight rotor load over a range of different heavy dead weight loads to obtain optimum stiffness and damping during operation of the turbomachine for the particular dead weight load involved. This is achieved through the use of at least one adjustable hanging spring support assembly resiliently connecting the annular housing 22 and the upper portion of the bearing support cage 35 so as to support the dead weight of the shaft 11 in a vertically centered position within the central bore 16. This enables the fluid film damper mechanism to maintain the shaft 11 centered both vertically and horizontally within the bore 16 by damping both vertical and horizontal vibrations of the shaft. It is presently preferred that the at least one adjustable hanging spring support assembly be the only mechanical spring support for the bearing support cage 35.

A single adjustable spring support assembly can be employed, extending from the upper portion of the bearing support cage 35 generally radially upwardly in the vertical plane containing the longitudinal axis 12. An even number of adjustable spring support assemblies can be provided at locations which are on opposite sides of and symmetrical to the vertical plane through the longitudinal axis 12. An odd number of adjustable spring support assemblies can be provided, with one being located in the vertical plane containing the longitudinal axis 12 and the remaining ones being at locations which are on opposite sides of and symmetrical to that vertical plane. Each such adjustable spring support assembly can extend either radially with respect to the longitudinal axis 12, or vertically, or at a non-radial angle to the vertical, so long as the adjustable spring support assembly is connected to an upper portion of the bearing support cage 35 and provides a vertical lifting force to the shaft 11 via the bearing support cage 35 in opposition to the gravitational force on the shaft 11. The use of two or more hanging spring assemblies is advantageous where the forces, to which the threads on the cap screw 64 are subjected as a result of a violent vibration, could result in a stripping of the threads of a single cap screw 64.

In the illustrated embodiment, the first and second adjustable spring support assemblies 61, 62 extend generally vertically upwardly from first and second locations on the upper portion of the bearing support cage 35, the first and second locations being on opposite sides of and equally spaced from the vertical plane 63 containing the longitudinal axis 12. The angle between the vertical plane 63, containing the longitudinal axis 12 of the shaft 11, and a line extending upwardly through the longitudinal axis 12 of the shaft 11 to the point of attachment of a support spring assembly 61 or 62 to the bearing support cage 35 is preferably less than about 25°, and more preferably is less than about 20°. As the two assemblies 61, 62 are constructed and mounted in a substantially identical manner, only assembly 61 will be described in detail, it being understood that such description applies also to the assembly 62.

As shown in FIG. 2, the spring support assembly 61 comprises an elongated connector in the form of a bolt or cap screw 64 which extends through a vertical hole 65 in the fixed housing 22, through the annular passageway 56, and into a threaded hole 66 in the bearing support cage 35, the hole 66 being coaxial with the hole 65 and being formed at a position which is located between the O-rings 48, 49. The lower end 67 of the bolt 64 is provided with external threads which engage the internal threads of the tapped hole 66 in the bearing support cage 35, while the lengthwise portion of the bolt 64 positioned within the hole 65 has a diameter which is smaller than the diameter of the hole 65 so that the bolt 64 and the bearing support cage 35 can move vertically with respect to the fixed housing 22. The head 68 of the bolt 64 is positioned in a counterbore 69, formed in the housing 22 so as to be coaxial with the hole 65, such that the radially outermost surface of the head 68 is even with, or recessed radially inwardly with respect to, the outer cylindrical surface 19 of the housing 22. As the diameter of the counterbore 69 is greater than the diameter of the hole 65, the bottom wall surface of the counterbore 69 is in the form of an upwardly and outwardly facing annular shoulder 71. If during installation it is determined that the bearing support cage 35 is too high or too low in the housing bore, the cap screws 64 can be rotated in the appropriate direction to better center the bearing support cage 35.

An annular spacer 72, having an external diameter which is smaller than the diameter of the counterbore 69, can be positioned coaxially with the bolt 64 so that the bottom surface of the annular spacer 72 rests on the upwardly facing annular shoulder 71 of the counterbore 69. A sleeve 73, having an internal diameter only slightly larger than the diameter of the bolt 64, is positioned coaxially about the bolt 64 and within the counterbore 69. The spacer 72 has an internal diameter which is greater than the diameter of the radially adjacent portion of the sleeve 73 such that the sleeve 73 can move vertically with respect to the spacer 72. The sleeve 73 prevents the Belleville washers from rubbing on the relatively soft metal of the bolt 64. An annular flange 74, which extends outwardly from the upper end of the sleeve 73 in a plane perpendicular to the longitudinal axis of the bolt 64, has an upper annular surface 75 and a lower annular surface 76. The diameter of the head 68 of the bolt 64 is greater than the inner diameter of the annular flange 74 and smaller than the external diameter of the annular flange 74, such that the head 68 contacts and is supported by the upper annular surface 75 of the annular flange 74.

A support spring 77 is positioned between and in contact with the upper surface of the annular spacer 72 and the lower annular surface 76 of the annular flange 74 in order to provide an upwardly directed force to counterbalance the weight of the shaft 11 and the bearing and thereby resiliently urge the bearing support cage 35 and the shaft 11 upwardly into a centered position within the central bore 17. In the illustrated embodiment, the support spring 77 comprises a plurality of Belleville washers, each having a frustoconical shape, which are in a stacked relationship with one another and which are coaxially positioned about the bolt 64. The stacked relationship can be any suitable configuration, e.g., all of the frustoconical washers facing in the same direction, downwardly facing frustoconical washers alternating with upwardly facing frustoconical washers, etc. The Belleville washers, which are made of hard steel, tend to flatten when subjected to compression parallel to the longitudinal axis of the bolt 64.

The spring rate of the Belleville spring 77 is determined by the number and orientation of the Belleville washers, and can be further adjusted by altering the length of the engagement between the bolt 64 and the bearing support cage 35, thereby adjusting the length of the portion of the bolt 64 between the outer surface 39 of the bearing support cage 35 and the lower surface of the flange 74, and thus adjusting the axial space available for the support spring 77. The axial space available for the support spring 77 can also be varied by selecting a sleeve 73 having a flange 74 with the desired thickness, and/or by replacing one or more of the Belleville washers with a flat washer, thereby permitting a maximum engagement between the external threads on the bolt 64 and the internal threads in the hole 66 in the bearing support cage 35 to be maintained.

The spacer 72 can be a single annular member or a plurality of flat steel washers, whereby the number of the steel washers can be selected to provide the desired height of the spacer 72 which corresponds to the number of Belleville washers used in the support spring 77. Thus, the number of Belleville washers can be selected to provide the desired degree of resilient support for the bearing support cage 35 and the shaft 11, and then the number of flat steel washers needed for the spacer 72 can be determined. While the spacer 72 has been illustrated as being between the support spring 77 and the upwardly facing shoulder 71, if desired, the spacer 72 can be positioned between the upper surface of the support spring 77 and the lower surface 76 of the annular flange 74, or two spacers can be employed, with one spacer being between the support spring 77 and the shoulder 71 and the other one being between the support spring 77 and the flange 74. At least the washers in the spacers which are in contact with the support spring 77 should be formed of hardened steel so as to resist the rubbing of the Belleville washers on the spacers as the Belleville washers deflect in response to vertical movement of the bearing support cage 35.

An O-ring 78 can be positioned in an annular groove 79, which is formed in the wall surface of the hole 65 and in the annular shoulder 71. The O-ring 78 is securely retained in the groove 79 by the spacer 72, and serves to prevent oil in the damper film chamber 55 from escaping through the hole 65.

The hanging spring assemblies of the present invention can support the gravity load of the shaft and bearing and lift the bearing support to a vertical center of the housing bore. The hanging spring assemblies can support a much larger gravity load than the O-rings, and thus are particularly advantageous with rotor assemblies having heavy loads.

The invention provides a particularly simple hanger spring arrangement which is easily adjustable within a range of selected spring rates to accurately position the shaft in a centered position within the housing and at the same time obtain the optimum damping and stiffness required for the rotor dead weight involved. Furthermore, the hanging spring support assembly provides a compact construction, which permits relatively easy adjustment of the spring force when mounting the shaft in the damper squeeze film bearing assembly.

The invention reduces the stiffness of the bearing support by removing the force otherwise required of the O-rings 48, 49 to vertically support the bearing cage 35 and the shaft 11 within the housing 22. With the hanging spring arrangements supporting the weight of the bearing as well as the shaft 11, the bearing support member 35 is centered in the housing bore, and the crush of each of the O-rings 48, 49 is essentially the same through the circumference of the squeeze film chamber 55, enabling the damping film to dampen out vertical vibrational movement of the rotating shaft as well as horizontal vibrational movement of the rotating shaft. Thus, the present invention provides a new and improved damper film bearing assembly which is particularly adapted for supporting a heavy dead weight rotor load. Moreover, the damper film bearing assembly is readily adjustable for a range of heavy dead weight loads, thereby providing the optimum levels of stiffness and damping for the particular dead weight load involved.

Reasonable variation and modifications are possible within the scope of the foregoing description, the drawings and the appended claims to the invention. For example, instead of utilizing the connectors 44, each of the bearing shoes 38 can be pivotally supported by one or two pivot pins extending into a radially extending slot, whereby the bearing shoe can pivot about the pins and movable radially with respect to the shaft 11.

That which is claimed is:

1. A damper film bearing assembly for supporting a rotatable shaft of a turbomachine comprising, a housing having a bore therethrough sized to receive said shaft with a longitudinal axis of said shaft extending at least generally horizontally through said bore;

an annular cavity formed in said housing and open to said bore around a circumference of said bore, said cavity including an annular wall surface which extends generally parallel to a longitudinal axis of said bore;

a bearing member movably mounted within said cavity and including an annular radially outer surface, confronting said annular wall surface of said cavity, and a radially inner surface, confronting said shaft to provide bearing support for said shaft within said housing, whereby said bearing member can vibrate horizontally and vertically within said cavity with respect to said housing;

a fluid film damper formed between said annular radially outer surface of said bearing member and said annular wall surface of said cavity for damping movement of said bearing member within said cavity; and at least one hanging support spring assembly mounted so as to extend generally upwardly from an upper portion of said bearing member to said housing for resiliently supporting said bearing member at a vertically centered position within said bore in opposition to a dead weight of said shaft, so that said at least one hanging spring assembly can function to center said bearing member within said bore of said housing and permit said fluid film damper to function to suppress vibration of said shaft.

2. A damper film bearing assembly in accordance with claim 1, wherein said housing has at least one upwardly facing shoulder associated with a hole in said housing;

wherein each said hanging support spring assembly comprises an elongated connector having first and second ends, with said first end of said elongated connector being secured to an upper portion of said bearing member and with said elongated connector extending upwardly from its first end through a hole in said housing so that the second end of said elongated connector is positioned above an upwardly facing shoulder associated with that hole;

a support spring positioned between the upwardly facing shoulder and said second end of said elongated connector so as to resiliently urge said elongated connector and said bearing member upwardly and thereby assist in maintaining said shaft in a vertically centered position within said bore.

3. A damper film bearing assembly in accordance with claim 2, wherein each said elongated connector extends generally radially with respect to the longitudinal axis of said bore.

4. A damper film bearing assembly in accordance with claim 2, wherein each said elongated connector extends at least substantially vertically.

5. A damper film bearing assembly in accordance with claim 2, wherein each said support spring assembly further comprises a spacer positioned about the elongated connector between the upwardly facing shoulder and the support spring.

6. A damper film bearing assembly in accordance with claim 2, wherein each said support spring comprises at least one Belleville washer.

7. A damper film bearing assembly in accordance with claim 2, wherein each said support spring comprises a plurality of Belleville washers positioned in a stacked arrangement with respect to each other, with the stacked arrangement being positioned coaxially with the associated elongated connector.

8. A damper film bearing assembly in accordance with claim 2, wherein said support spring has a spring force, wherein said elongated connector has a portion which extends from said annular radially outer surface of said bearing member to said second end of said elongated connector, wherein said portion of said elongated connector has a length, and wherein said first end of said elongated connector is secured to said bearing member in a manner permitting adjustment of the length of said portion of said elongated connector, thereby enabling adjustment of said spring force of said support spring.

9. A damper film bearing assembly in accordance with claim 2, wherein said at least one support spring assembly comprises two support spring assemblies positioned on opposite sides of and symmetrical to a vertical plane containing said longitudinal axis of said shaft.

10. A damper film bearing assembly in accordance with claim 2, wherein said bearing member comprises an annular ring having said radially outer surface and a radially inner surface, and a plurality of bearing shoes positioned circumferentially about said shaft and between said shaft and said radially inner surface of said annular ring, each of said bearing shoes being loosely connected to said annular ring and having a radially inner surface confronting said shaft to provide bearing support for said shaft within said housing.

11. A damper film bearing assembly in accordance with claim 2, wherein said fluid film damper comprises first and second O-rings positioned between said bearing member and said housing, said O-rings being spaced apart from each other along the longitudinal axis of said bore to define a squeeze film chamber, and a passageway in said housing for supplying pressurized oil to said squeeze film chamber.

12. A damper film bearing assembly in accordance with claim 2 wherein each said support spring is disposed above said cavity whereby said bearing member and said shaft are supported in a hanging position within said cavity by the support spring.

13. A damper film bearing assembly in accordance with claim 12, wherein each said elongated connector extends at least substantially vertically.

14. A damper film bearing assembly in accordance with claim 13, wherein each said support spring comprises at least one Belleville washer.

15. A damper film bearing assembly in accordance with claim 13, wherein each said support spring comprises a plurality of Belleville washers positioned in a stacked arrangement with respect to each other, with the stacked arrangement being positioned coaxially with the associated elongated connector.

16. A damper film bearing assembly in accordance with claim 15, wherein each said support spring assembly further comprises a spacer positioned about the elongated connector between the upwardly facing shoulder and the support spring.

17. A damper film bearing assembly in accordance with claim 16, wherein said support spring has a spring force, wherein said elongated connector has a portion which extends from said annular radially outer surface of said bearing member to said second end of said elongated connector, wherein said portion of said elongated connector has a length, and wherein said first end of said elongated connector is secured to said bearing member in a manner permitting adjustment of the length of said portion of said elongated connector, thereby enabling adjustment of said spring force of said support spring.

18. A damper film bearing assembly in accordance with claim 17, wherein said at least one support spring assembly comprises two support spring assemblies positioned on opposite sides of and symmetrical to a vertical plane containing said longitudinal axis of said shaft; and wherein an angle between a vertical plane, containing the longitudinal axis of the shaft, and a line extending upwardly through the longitudinal axis of the shaft to a point of attachment of a support spring assembly to the bearing member is less than about 25°.

19. A damper film bearing assembly in accordance with claim 18, wherein said bearing member comprises an annular ring having said radially outer surface and a radially inner surface, and a plurality of bearing shoes positioned circumferentially about said shaft and between said shaft and said radially inner surface of said annular ring, each of said bearing shoes being loosely connected to said annular ring and having a radially inner surface confronting said shaft to provide bearing support for said shaft within said housing.

20. A damper film bearing assembly in accordance with claim 19, wherein said fluid film damper comprises first and second O-rings positioned between said bearing member and said housing, said O-rings being spaced apart from each other along the longitudinal axis of said bore to define a squeeze film chamber, and a passageway in said housing for supplying pressurized oil to said squeeze film chamber.

* * * * *